United States Patent [19]
Berger et al.

[11] Patent Number: 6,061,617
[45] Date of Patent: May 9, 2000

[54] ADAPTABLE CONTROLLER FOR WORK VEHICLE ATTACHMENTS

[75] Inventors: Alan Daniel Berger, Winfield, Ill.; Richard L. Hall, Burlington, Iowa

[73] Assignee: Case Corporation, Racine, Wis.

[21] Appl. No.: 08/955,351

[22] Filed: Oct. 21, 1997

[51] Int. Cl.[7] .................................................. A01B 49/00
[52] U.S. Cl. ............................ 701/50; 701/35; 364/147
[58] Field of Search ................................. 701/50, 35, 33; 364/146, 147, 188, 131; 172/4.5, 9, 50

[56] References Cited

U.S. PATENT DOCUMENTS

| | | |
|---|---|---|
| 3,789,939 | 2/1974 | Geislinger . |
| 4,715,012 | 12/1987 | Mueller, Jr. ................................. 701/50 |
| 4,744,218 | 5/1988 | Edwards et al. ............................ 60/368 |
| 4,807,131 | 2/1989 | Clegg .......................................... 701/50 |
| 5,113,344 | 5/1992 | Kellogg et al. ............................. 701/35 |
| 5,261,495 | 11/1993 | Szymczak .................................... 172/2 |
| 5,274,557 | 12/1993 | Moriya et al. ...................... 364/167.06 |
| 5,322,129 | 6/1994 | Sheeter ........................................ 701/50 |
| 5,359,517 | 10/1994 | Moriya et al. .............................. 701/50 |
| 5,404,661 | 4/1995 | Sahm et al. ................................. 37/905 |
| 5,467,541 | 11/1995 | Greer et al. ................................. 37/348 |
| 5,528,843 | 6/1996 | Rocke ......................................... 37/348 |
| 5,557,510 | 9/1996 | McIntyre et al. ........................ 364/146 |
| 5,692,376 | 12/1997 | Miki et al. .................................. 60/328 |
| 5,897,600 | 4/1999 | Elmore et al. .............................. 701/50 |

*Primary Examiner*—Tan Nguyen
*Attorney, Agent, or Firm*—Mayer, Brown & Platt

[57] ABSTRACT

An adaptable control system for the efficient use of different implement attachments for a work vehicle is disclosed. The work vehicle has an actuator for attachment and operation of different implements. The actuator is controlled by a control unit. The control unit has an input coupled to a user operated control device. The control unit is coupled to the actuator and activates the actuator in response to the user operated control device. An attachable implement such as a loader bucket is attached to the actuator. An implement data input such as a card slot is coupled to the processor. A portable data storage device, such as a data card, corresponding with the specific implement is inserted in the data input. The data storage device transmits instruction data relating to the specific implement to the implement data input. The controller operates the actuator in accordance to the data read from the data storage device. Alteratively a sensor may read identification data from an identification indicator on the implement attachment. The controller then selects corresponding instruction data from a memory device.

42 Claims, 8 Drawing Sheets

ADAPTABLE CONTROLLER FOR WORK VEHICLE ATTACHMENTS

FIELD OF INVENTION

This invention relates to implement attachments for work vehicles. More specifically, this invention relates to a system which configures a controller in a work vehicle to accommodate specific characteristics of a selected implement attachment.

BACKGROUND OF INVENTION

Work vehicles, as opposed to vehicles for personnel transport have the capability to operate different attachable implements. For example, work vehicles such as tractors in the agricultural field or loader/backhoes and skid steers in the construction field have the ability to operate different implement attachments. Such vehicles are multi-functional because they are capable of operating a variety of implements which may be attached to the vehicle via different connection points. These implements such as loader buckets, augers, plows etc. are typically operated by hydraulic cylinders or other actuators.

An example of a work vehicle in the agricultural field is the Model MX135 tractor manufactured by Case Corporation. This tractor has a rear mounted three point hitch which may be connected to an attachable implement such as a plow or planter. The implement draws hydraulic power for operation from the tractor.

An example of a work vehicle in the construction field is the Case Model 580SLE loader/backhoe. This vehicle has a pair of front actuator arms and a rear backhoe boom. A variety of loader buckets and other implements may be attached to the front actuator arms and rear backhoe. These implements may be controlled by the work vehicle operator.

The operation of attached implements on construction or agricultural work vehicles has been accomplished through manual controls which activate hydraulic cylinder actuators. Such controls are cumbersome and difficult to operate since a different manual control lever must be used for each degree of movement of the implement. The operation of attached implements has been facilitated with the aid of an electronic controller which simplifies the operator controls for an attached implement. An electronic controller allows mechanical activation of actuators by electronics, thus eliminating the necessity of manual operation. Additionally, an electronic controller allows the replacement of multiple control levers with a single joystick, greatly simplifying the operation of an attached implement by a work vehicle operator.

However, different attachment implements oftentimes require different types of controls. For example, hydraulic pressure for the actuation cylinders may differ from implement to implement. Additionally, the degree of movement on the actuator arm or arms may differ according to the function of different implements. The inability to adapt a controller and therefore the hydraulic actuators to specific implements has resulted in less efficient operation of all implements. Also, the operator must monitor the operation of the implement closely. Optimal lifting or digging capabilities cannot be achieved because a controller must be capable of operating many implements. These problems have been exacerbated through constant redesign of existing attachment implements and the introduction of new ones. Additionally, the work vehicles themselves are modified and improved. This results in the use of many different implements having different actuation requirements.

Therefore, it would be beneficial to provide an adaptable controller which may be configured for specific implements. There is a need for an attachable implement which provides an identification indicator to a controller. Further there is a need for a mechanism to store instructions tailored to a particular implement for programming a controller.

SUMMARY OF THE INVENTION

The present invention is embodied in an adaptable control system for an implement attachment. The control system is mounted on a work vehicle which has an actuator for attachment and operation of different implement attachments. An implement attachment is attached to the actuator. A data storage device is provided with instruction data relating to the implement attachment. The control system has a controller operatively coupled to the data storage device and which receives instruction data from the data storage device. The controller communicates control instructions to the actuator.

A second embodiment of the present invention is an adaptable control system for operating different implement attachments. The control system is mounted on a work vehicle which has an actuator for attachment and operation of different implement attachments. The control system has a controller which has an output coupled to the actuator. The controller activates the actuator in response to instruction data. An implement attachment is mateable with the actuator. An implement attachment identification device is coupled to the controller and identifies the implement attachment and transmits identification data to the controller. A data storage device transmits selected instruction data relating to the implement attachment according to the identification data transmitted by the implement attachment identification device.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

DESCRIPTION OF THE PREFERRED EMBODIMENT

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

Figure 1:
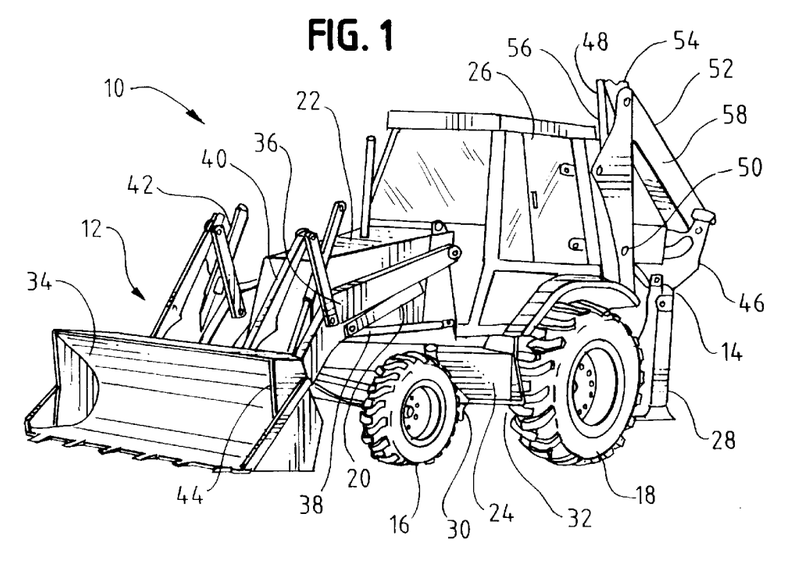
FIG. 1 is a perspective view of a work vehicle using attachable implements according to the present invention.

Referring now to the drawings and more particularly to FIG. 1, there is shown a side perspective diagram of a work vehicle 10. In this embodiment, the work vehicle 10 is a Model 580 SLE loader/backhoe manufactured by Case Corporation. The work vehicle 10 is capable of operating various implement attachments. The vehicle 10 has a front implement attachment 12 and a rear implement attachment 14. As will be explained, different implement attachments may be mounted on the front and rear of the work vehicle 10. These implement attachments may be, for example, loader buckets, augers, brushes and other implements which are connectable to connection points on the work vehicle.

The work vehicle 10 has a pair of front wheels 16 and pair of back wheels 18. The vehicle 10 is powered by a diesel engine 20 and may either have a rear wheel drive or a four wheel drive or, for other types of work vehicles, a front wheel drive. The engine 20 is mounted under an engine hood 22. A fuel tank 24 is mounted in the middle of the vehicle 10 and supplies fuel to the engine 20 to drive wheels 16 and 18.

The user drives the vehicle 10 and controls the front and rear implement attachments 12 and 14 from an operator compartment 26. The operator compartment 26 has the controls for driving the work vehicle 10 and operating the front and rear implement attachments 12 and 14. A pair of hydraulically actuated stabilizers 28 may be lowered to elevate the rear wheels 18 from ground contact during operation of the rear implement attachment 14. Electrical power for the vehicle 10 is supplied by a battery 30. Hydraulic power for the front and rear implement attachments 12 and 14 and other vehicle components is supplied via a hydraulic pump (not shown) which draws hydraulic fluid from a hydraulic reservoir 32. The hydraulic pump is powered by the engine 20.

The front implement attachment 12 of the vehicle 10 is shown as a loader bucket 34. The loader bucket 34 is supported by a pair of loader arms 36 which are pivotally attached to the front of the vehicle 10. The loader arms 36 are raised and lowered by hydraulic cylinder actuators 38. Control arms 40 connect the loader bucket 34 to the loader arms 36. A second pair of hydraulic cylinder actuators 42 is connected to the loader arms 36 and the loader bucket 34 to provide rotational motion for the loader bucket 34. A clam 44 is attached to the front of the loader bucket 34 and may be rotated in an open or closed position (closed shown). The loader bucket 34 is attached to the loader arms 36 by means of two mechanical attachment points (not shown). As will be explained below, different implements may be substituted for the loader bucket 34.

The rear implement attachment 14 of the vehicle 10 is shown as a digger bucket 46. The rear implement attachment 14 is supported by a backhoe boom 48. One end of the backhoe boom 48 is attached to the rear of the vehicle 10 at an attachment joint 50. The backhoe boom 48 may be moved in the horizontal plane or rotated in a vertical plane from the attachment joint 50. The opposite end of the backhoe boom 48 is attached to a dipper arm 52 by a rotation joint 54. The dipper arm 52 also may be pivoted from the joint 54. The opposite end of the dipper arm 52 is connected to the digger bucket 46. The backhoe boom 48 may be retracted or extended by means of a hydraulic actuator such as a dipper cylinder 56. The dipper arm 52 may also be extended or retracted by means of another hydraulic actuator such as a bucket cylinder 58. Both the front and rear implement attachments 12 and 14 are operated by their respective actuators which are controlled from the operator compartment 26.

Figure 2:
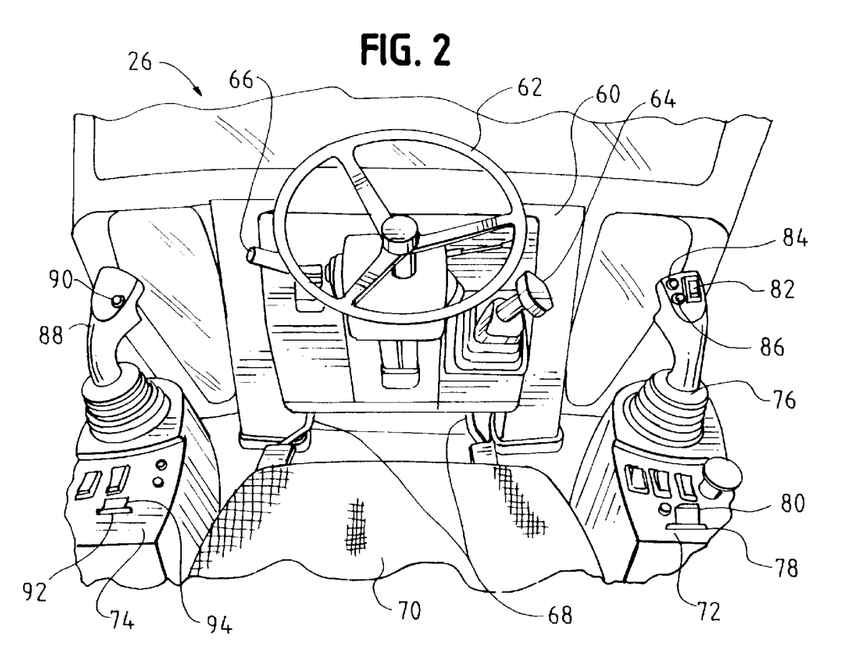
FIG. 2 is a perspective view of the operator compartment of the work vehicle in FIG. 1.

FIG. 2 shows a perspective view of the interior of the operator compartment 26. The interior of the operator compartment 26 has a control panel 60 which may be located, for example, in the front of the operator compartment 26. A steering wheel 62 is mounted on the control panel 60. The steering wheel 62 controls the orientation of the front wheels 12 and is used by an operator to steer the vehicle 10. A gear shift 64 is mounted on the control panel 60 to shift the drive train and hence the engine 20 to different speeds. A power shuttle lever 66 controls the direction of the vehicle 10. The power shuttle lever 66 may be placed in forward, reverse and neutral to control the direction of the vehicle 10. A pair of brake pedals 68 are located below the control panel 60. Each brake pedal activate brakes for the front wheel and rear wheels 16 and 18 on one side of the vehicle 10.

The operator is seated in a control seat 70 which is located in proximity to the control panel 60 and the steering wheel 62. The control seat 70 has 360° rotation on a swivel mount (not shown), allowing an operator to swivel to face either the front or the rear of the vehicle 10. The control seat 70 has right and left armrest control panels 72 and 74.

A right lever 76 is mounted on the right armrest panel 72. An optional slot 78 is provided for the insertion of a data storage device such as a PCMCIA card 80 which stores instruction data, such as a program or parameters for controlling the front attachment 12. The right lever 76 has a switch 82 and control buttons 84 and 86.

A left lever 88 is mounted on the armrest panel 74 of the control seat 70 and has a button 90. An optional slot 92 is provided on the armrest panel 74 for the insertion of a data storage device such as PCMCIA card 94 which provides instruction data for controlling the rear implement attachment 14.

The levers 76 and 88 provide electronic controls for the operation of the hydraulic cylinder actuators for either the front or rear implement attachments 12 and 14 of the vehicle 10. In the embodiment shown in FIG. 1, the levers 76 and 88 control the loader bucket 34 and the digger bucket 46, respectively. The levers 76 and 88 activate different electronic controls depending on the position of the control seat 70. In the position shown in FIG. 2, where the control seat 70 is facing forward, the control lever 76 controls the loader bucket 34. When the lever 76 is moved forward the loader bucket 34 is pushed into a digging position by actuators 38. When the lever 76 is pulled back toward the control seat 70 the loader bucket 34 is retracted in a direction away from the ground and over the operator compartment 18 by actuators 38. When the lever 76 is moved to the left, the loader bucket 34 is tilted or rolled up by actuator 42. When the lever 76 is moved to the right, the loader bucket 34 is tilted or rolled down by actuator 42, thus dumping the contents of the loader bucket 34. Pressing button 84 returns the loader bucket 34 to a memorized position such as a carry position where the loader bucket 34 is rolled back and maintained at a set level above the ground. Pressing button 86 places the loader bucket 34 in the dig position. Switch 82 is a three wheel switch which opens or closes the clam 44 of loader bucket 34. The lever 88 is not active when the control seat 70 is in the forward position.

When the control seat 70 is swiveled 180° so it is facing the rear of the vehicle 10, both levers 76 and 88 are used to control the rear implement attachment 14. The right lever 76 controls the backhoe boom 48 by activating dipper cylinder 56. When the right lever 76 is moved forward, the backhoe boom 48 is raised by the dipper cylinder 56. When the right lever 76 is pulled back, the backhoe boom 48 is lowered by the bucket cylinder 58. When the right lever 76 is moved to the left, the digger bucket 46 is rotated downward and is closed. When the right lever 76 is moved to the right, the digger bucket 46 is rotated upward and opened. Switch 82 operates an optional extend-a-hoe (not shown) which is a retractable arm mounted on the dipper arm 52. Toggling switch 82 extends or retracts the extend-a-hoe. When the control seat 70 is in the rearward position, buttons 84 and 86 are inactive.

Moving the left lever 88 from side to side swings the backhoe boom 48 from side to side. Moving the left lever 88 forward extends the backhoe dipper 52 by bucket cylinder 58 while pulling the left lever 88 back retracts the backhoe dipper 52.

The hydraulic cylinder actuators which are used to move both front and rear implement attachments 12 and 14 are activated by separate programmable electronic controllers to simplify their operation. One embodiment of the present invention is an adaptable control system for different implement attachments which may be mounted on the work vehicle 10. The control system operates an actuator such as front loader arms 36 and control arms 40. The actuator allows attachment and operation of different implement attachments. The controller may have an input coupled to a user operated control device such as lever 76. The controller communicates instruction data to the actuator. An implement attachment, such as loader bucket 34, is attached to the actuator on the work vehicle 10. A data storage device, such as PCMCIA card 80, is operatively coupled to the controller and stores instruction data relating to the implement attachment.

Figure 3:
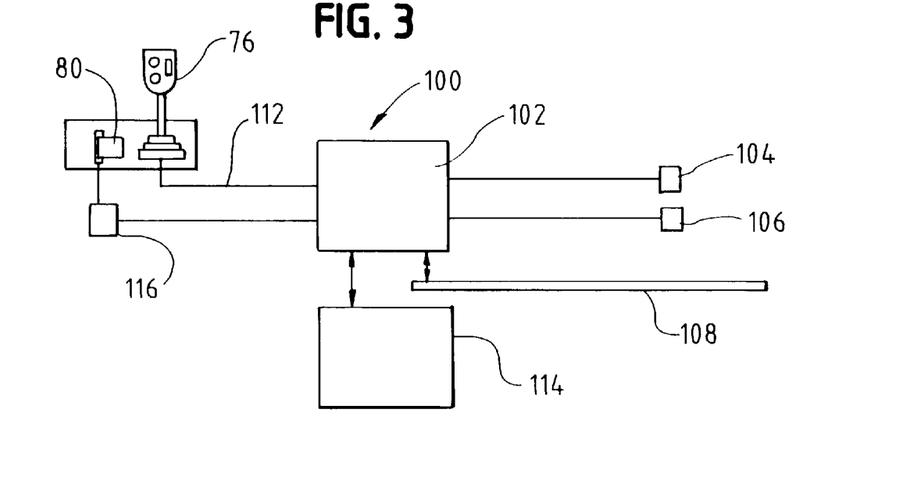
FIG. 3 is a block diagram of a control system for an attachment implement using a smart card according to the present invention.

FIG. 3 shows a block diagram of a control unit 100 according to the present invention which controls the actuators 38 and 42 to manipulate front implement attachment 12. The front implement attachment is the loader bucket 34 in FIG. 1, although as will be detailed, other implement attachments may be controlled by control unit 100. The control unit for the rear implement attachment 14 is similar in design to the control unit 100. The control unit 100 has a digital microcontroller 102. The digital microcontroller 102 is a programmable controller such as a 80196 Model Microcontroller manufactured by Intel. However, microcontroller 102 may be any other suitable microcontroller, microprocessor or ASIC. The microcontroller 102 is coupled to actuator outputs 104 and 106 which control hydraulic fluid valves between hydraulic fluid reservoir 32 and hydraulic actuators 38 and 42. These actuators 38 and 42 actuate the loader arms 36 and the control arms 40 for the loader bucket 34. A control input 112 is coupled to the right lever 76 and transmits signals from the lever 76 to the microcontroller 102. The corresponding controller for the rear implement attachment 14 has a control input coupled to left lever 88. The microcontroller 102 is coupled to the corresponding microcontroller for the left lever 88 via a CAN bus 108. The CAN bus 108 enables both microcontrollers to share common operational commands when controlling the rear implement attachment 14. Of course, other data connections such as other serial or parallel buses may be used to share common operational commands between control units.

The microcontroller 102 is also coupled to a memory 114 which contains stored programs and data for the basic operation of actuators 38 and 42 in response to the movement of lever 76. The memory 114 may be an electronically erasable programmable read only memory (EEPROM), electronically programmable read only memory (EPROM), read only memory (ROM) or other permanent memory devices. The microcontroller 102 is also connected to a data storage device which includes an implement data input such as a data port 116 and a removable memory, such as the PCMCIA card 80 which is mateable with the data port 116. The removable memory 80 contains a specific set of instruction data which is used by the controller 102 to control the actuators 38 and 42 for the front implement attachment 12.

The removable memory may be any storage medium which allows transmission of data such as a floppy disk, data card, tape, CD-ROM, etc. The removable memory provides the instruction data which is sent by the microcontroller 102 to the specific electronic controls which are required for the particular attachment.

A second embodiment of the present invention is an adaptable control system for operating different implement attachments. The control system according to the second embodiment is mounted on the work vehicle 10 for operation of different implement attachments by an actuator. The control system has a controller having an output coupled to the actuator. The controller activates the actuator in response to instruction data. An implement attachment mateable with the actuator is attached to the actuator. An implement attachment identification device is operatively coupled to the controller which identifies the implement attachment and transmits identification data to the controller. Finally, a data storage device transmits selected instruction data relating to the implement attachment according to the identification data transmitted by the implement attachment identification device.

The implement attachment identification device may be a non-contact sensor or an operator selection device from a screen display or any similar device. The data storage device may be a data card, EPROM, EEPROM, ROM, a CD-ROM, floppy disk, hard disk or other portable memory storage or similar devices. Any of the implement attachment identification devices may be combined with any of data storage devices with the appropriate interface electronics to be consistent with the second embodiment of the present invention. However, it is to be understood that the present invention is not limited to these particular data and implement attachment identification mechanisms.

Figure 4:
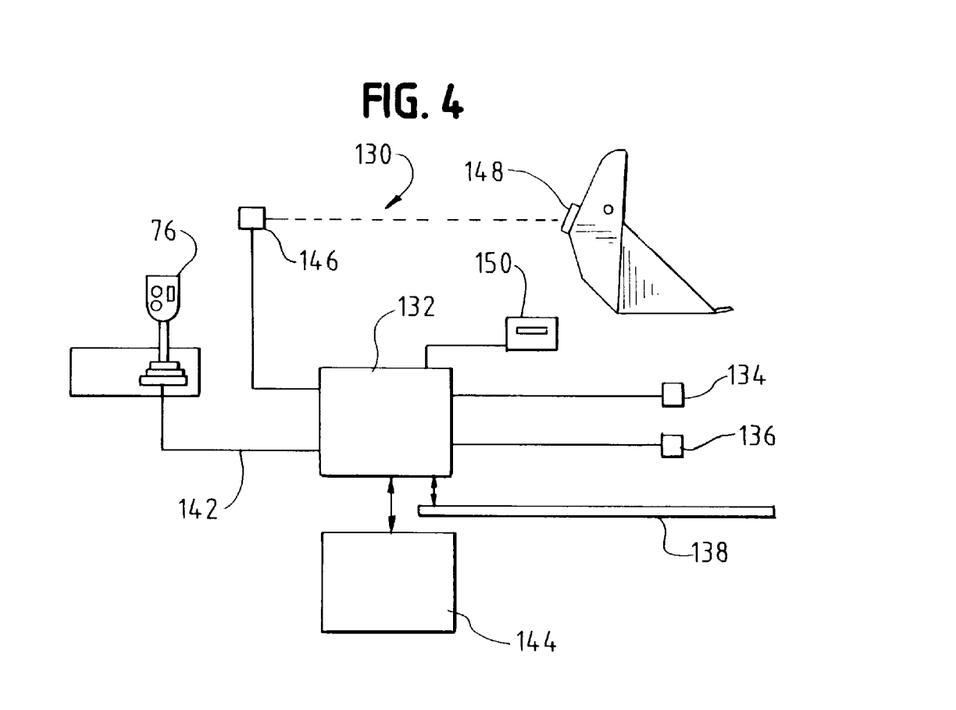
FIG. 4 is a block diagram of an alternate control system using a remote sensor for identifying an implement attachment according to the present invention.

An example of the second embodiment of the present invention is shown in the control system 130 in FIG. 4. The control unit 130 in FIG. 4 is similar to the control unit 100 in FIG. 3. Control unit 130 has a microcontroller 132. The microcontroller 132 is connected to a pair of actuator outputs 134 and 136 which control hydraulic valves for activating actuators 38 and 42. A control input 142 is coupled to the right lever 76. The microcontroller 132 is coupled to the corresponding microcontroller for the left lever 88 via a CAN bus 138. The microcontroller 132 is also coupled to a memory 144 which contains stored programs and data for the basic operation of front implement attachment 12 in response to the movement of lever 76.

The controller unit 130 in FIG. 4 differs from the controller unit 100 in FIG. 3 in that it includes an implement attachment identification device such as a non-contact sensor 146 coupled to microcontroller 132. The sensor 146 may be an optical sensor capable of optically sensing an identification indicator such as identification panel 148 which is mounted on the front attachment 12 in visual proximity to the sensor 146. The identification panel 148 contains unique identification data associated with the attachment. This identification data may be the attachment part number in the form of a bar code or other codes. In this embodiment, instruction data relating to a series of different attachments is stored in memory 144. The microcontroller 132 is programmed to access the stored instruction data relating to the attached front implement attachment 12 according to the identification data read by the sensor 146 from the identification panel 148. Other types of non-contact sensors such as RF, infra-red, or inductive sensors may be used for sensor 146. The appropriate signal transmitter i.e. RF, infra-red or inductive is then installed on the implement attachment.

Alternatively, a separate data storage device such as CD-ROM drive 150 may be coupled to microcontroller 132. The separate data storage device such as CD-ROM drive 150 reads instruction data for different implements contained on a portable storage device such as a CD-ROM instead of memory 144. Any large portable storage device such as a floppy disk, hard drive, data card, ZIP drive, Syquest drive, Bernouilli drive, etc. may contain the instruction data. Such a configuration can be advantageous because it allows the addition of instruction data for new implement attachments by rewriting the portable storage device. Furthermore, informational data for different types of implement attachments may be stored on separate portable storage devices for greater user flexibility.

Figure 5:
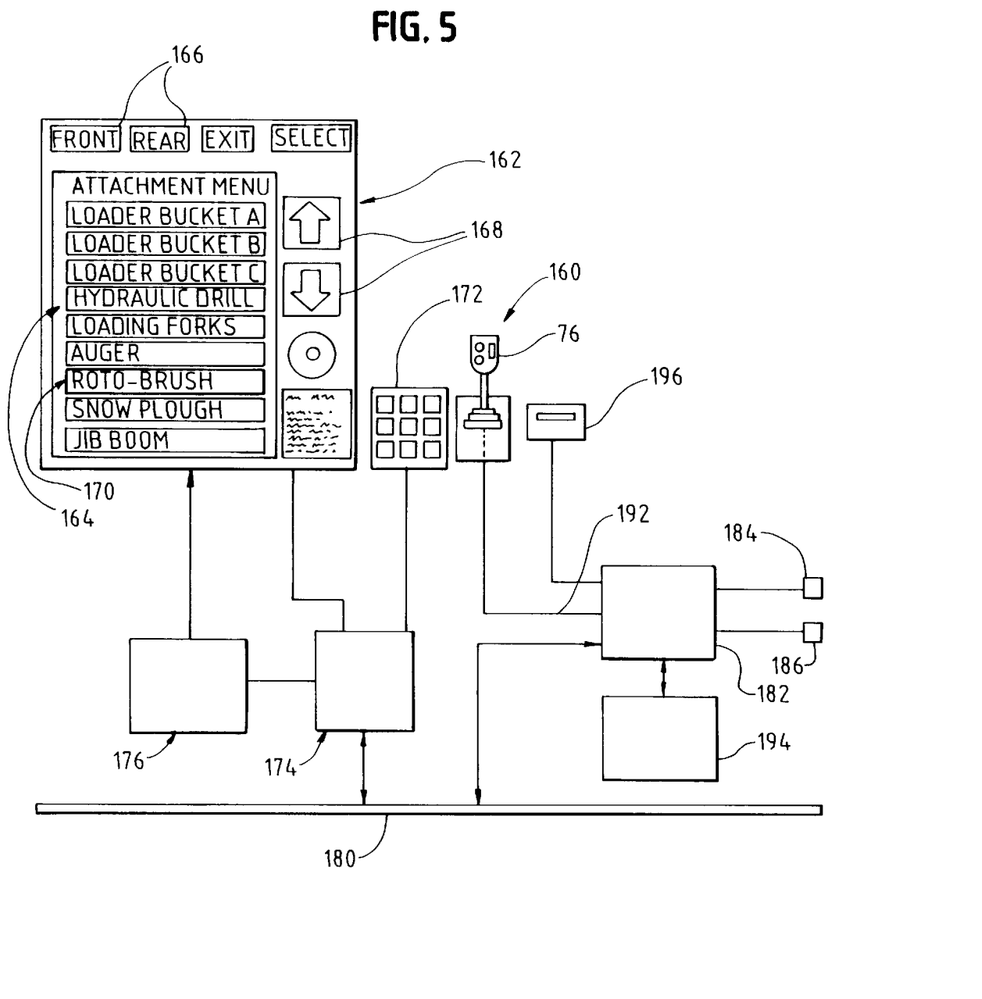
FIG. 5 is a block diagram of an alternate control system using a user display selection for identifying an implement attachment according to the present invention.

An alternate configuration of the second embodiment is shown as a control unit 160 in FIG. 5. The control system 160 has an implement attachment identification device which is shown as a visual display screen 162 located in the operator compartment 26. The visual display screen may be a CRT monitor, an LCD, or other similar visual display. The display 162 may be used in conjunction with other vehicle displays such as status functions, control information, data display, position display etc. The display 162 is programmed to display a menu 164 which gives the user a number of attachment options. A user selects the particular attachment point for the vehicle using attachment selection keys 166. The keys 166 may be mechanical switches, electromechanical switches or touch sensitive are as on the display 162. For purposes of explanation, the display 162 is shown as a touch screen. The user may scroll down the selections for that attachment point by means of touch screen directional keys 168. Selection keys 170 on menu 164 correspond to different implement attachments which may be mounted on the particular attachment point. The display 162 is programmed to show information on the selected attachments.

Of course, the display 162 may be programmed for selection by touch screen or an optional keypad 172 which is located on the control panel 60. The display 162 is coupled to a microprocessor 174 which may be responsible for other vehicle functions such as location positioning, data acquisition and processing etc. The microprocessor 174 operates the display 162 by means of a video random access memory (VRAM) 176.

The microprocessor 174 is coupled to a microcontroller 182 via a bus 180. As with the control units 100 and 130 in FIGS. 3 and 4, the microcontroller 182 has two actuator control outputs 184 and 186. The microcontroller has a user input 192 which receives commands from a user input device such as the lever 76. The microcontroller 182 also is coupled to a memory 194. The microcontroller 182 and the microprocessor 174 may have access to a data storage device, such as CD-ROM drive 196, through the bus 180 for the instruction data as explained above. Of course, the microcontroller 182 may be replaced by the microprocessor 174 with appropriate modifications.

In practice, a user selects different implements, such as the loader bucket 34 or the digger bucket 46, for attachment to the front and rear of the work vehicle 10. The selected front and rear implement attachments are then physically attached to either loader arms 36 or backhoe boom 48. The implements are attached typically by releasable mechanical clamps. Any appropriate hydraulic actuators are connected to the attached implements and any necessary electrical connections are also made. Other attachment means such as a three point hitch may also utilize the principles of the present invention.

Using the control unit 100 in FIG. 3 requires selecting the PCMCIA card 80 associated with the loader bucket 34. The proper PCMCIA card 80 as associated with the loader bucket 34 is inserted in the card slot 78 in the operator compartment 26. The data stored on the PCMCIA card 80 is used to provide specific operations and instructions to tailor the front attachment controller, control unit 100, to the specific characteristics of the loader bucket 34.

Similarly, the PCMCIA card 94 associated with the digger bucket 46 is inserted in card slot 92. The data on card 94 provides specific operations and instructions for the rear attachment microcontroller, which is similar to digital microcontroller 102, for specialized control of the digger bucket 46.

Alternatively, the control unit 130 in FIG. 4 may used to control the front implement attachment 12. Once the implement attachment, such as the loader bucket 34, is physically connected, the sensor 146 reads the identification panel 148 on the loader bucket 34. The microcontroller 132 loads the appropriate instruction data from memory 144 for the loader bucket 34.

Alternatively, using the control unit 160 in FIG. 5 requires an operator to select the proper implement attachment by touching the selection key relating to the loader bucket 34 from the menu 164. Once the selection is made, the microprocessor 174 transmits the identification data relating to the implement attachment to the microcontroller 182. The microcontroller 182 then loads the appropriate instructions from memory 194 or storage device 196 for the loader bucket 34.

Using either control unit 100 in FIG. 3, control unit 130 in FIG. 4 or control unit 160 in FIG. 5 results in instruction data specific to the attached implement to be loaded into the appropriate microcontroller. Using the example of control unit 100, in the case of the front implement attachment 12, the instruction data relate to the operation of hydraulic actuators 38 and 42 through valve controls 104 and 106. The instruction data includes appropriate control signals to maintain hydraulic pressure to stabilize the loader bucket 34. The instructions also include signals to the actuators 38 and 42 to keep the bucket loader 34 at a constant attitude while raising or lowering the loader bucket 34. Separate instructions permit a user to move the loader bucket 34 to preprogrammed positions which may be stored in the PCMCIA card 80. A set of instructions prevents rollback of the loader bucket 34 when it is raised over the operator compartment 26 by the limiting the extension of the actuators 42 which tilt the loader 34.

Similarly, a controller unit similar to control unit 100 in FIG. 3, control unit 130 in FIG. 4 or control unit 160 in FIG. 5 may be used to operate the rear implement attachment 14. The specific instructions and program data relate to the operation of cylinders 56 and 58 to allow the digger bucket 46 to perform different functions. These functions include flat bottoming, trenching, grading, and automatic compaction, for example.

Of course different sized and configured loader buckets 34 and digger buckets 46 may also be attached to the loader arms 36 and the backhoe boom 48. Different sized and shaped buckets may be efficiently operated since the corresponding cards or selected instructions will adjust system operating parameters to maximize use of such implements. Of course such implements will use many of the similar control commands as the loader bucket 34 and the digger bucket 46 shown in FIG. 1.

Figure 6A:
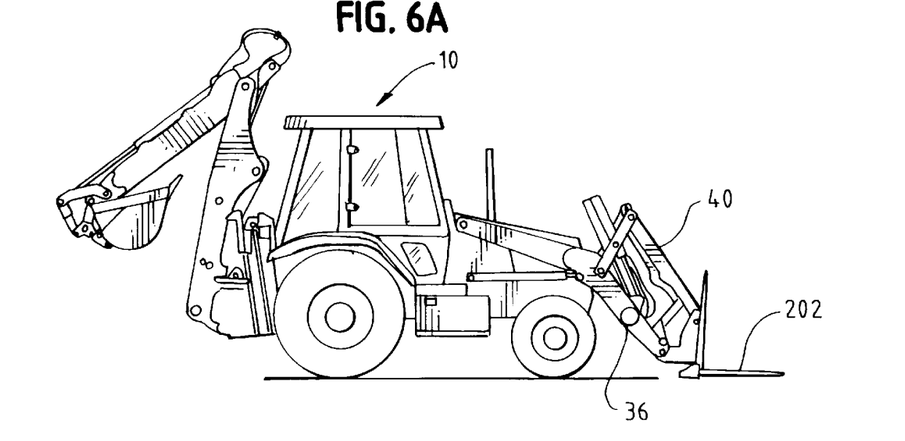
FIGS. 6A–6C are side perspective views of the work vehicle in FIG. 1 with different front implement attachments.
Figure 6B:
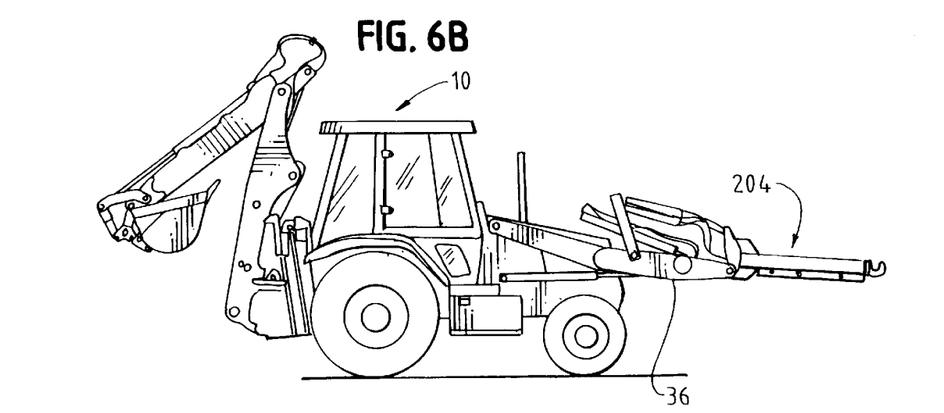
Figure 6C:
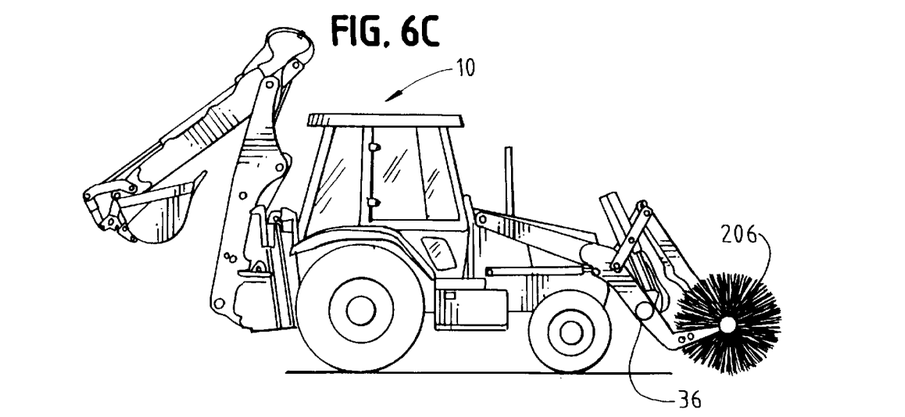

The present invention may be applied to a wide variety of attachable implements. FIGS. 6A–6C show examples of different attachable implements which may be substituted for loader bucket 34 on vehicle 10. FIG. 6A shows a pair of loader forks 202 attached to the loader arms 36 of the vehicle 10. The loader forks 202 are used to lift and transport materials. An operator attaches the loader forks 202 to the releasable clamps on the loader arms 36 and control arms 40.

If the controller for the front attachment is control unit 100 in FIG. 3, the operator inserts the appropriate PCMCIA card for the loader forks 202 in slot 78. The stored instruction data is loaded from the card to the microcontroller 102. If the controller for the front attachment is control unit 130 in FIG. 4, the sensor 146 reads the identification data from an identification panel on the loader forks 202. The microcontroller 132 then loads the appropriate instruction data relating to the loader forks 202 from the memory 144.

The loaded instruction data limit the actuation of the loader arms 36 and control arms 40 to maintain the loading forks 202 in a level position when the forks are raised. The instruction data also may include commands to maintain the loading forks in a fixed elevated position for transport.

FIG. 6B shows a jib boom 204 attached to the loader arms 36 of vehicle 10. As explained above, the present invention allows an operator to load specific instruction data for the jib boom 204 to the microcontroller. The instruction data disables the anti-roll back function because it is unnecessary with a jib boom.

FIG. 6C shows a roto brush 206 attached to the loader arms 36. As explained above, an operator loads specific instruction data for the roto brush 206 to the microcontroller. The instruction data automatically places the loader arms 36 in a "float" position when the brush is turned on.

Figure 7A:
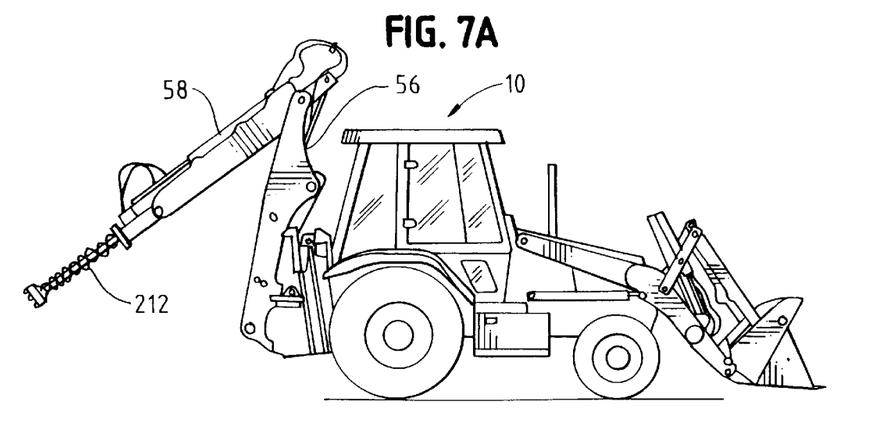
FIGS. 7A–7C are perspective views of the work vehicle in FIG. 1 with different rear implement attachments.
Figure 7B:
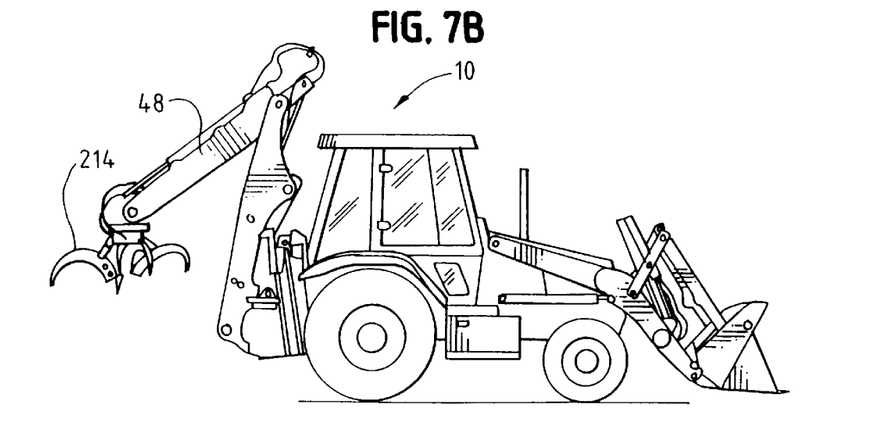
Figure 7C:
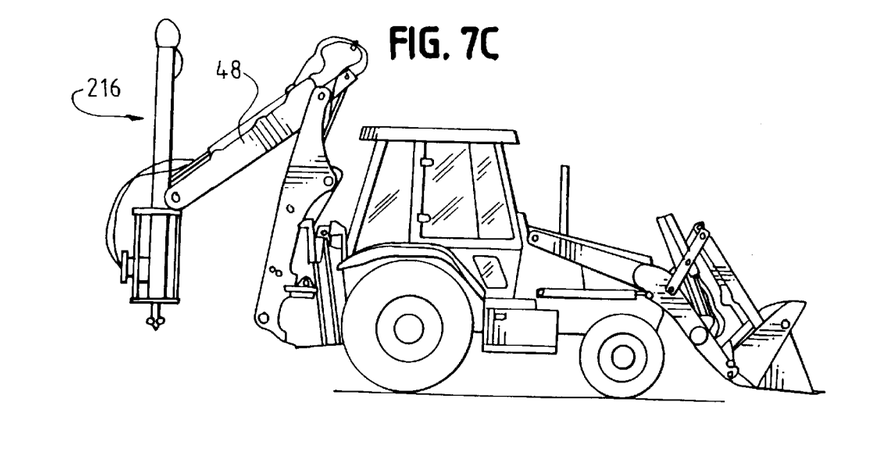

FIGS. 7A–7C show examples of different rear implement attachments which may be substituted for digger bucket 46 on the vehicle 10 in FIG. 1. FIG. 7A shows an auger 212 attached to the backhoe boom 48. The auger 212 is coupled to an auxiliary hydraulic jack for rotational actuation (not shown). The auger 212 requires data instructions loaded from a data card, assuming a controller similar to control unit 100 in FIG. 3 or read from a memory device, assuming a controller similar to control unit 130 in FIG. 4 to operate cylinders 56 and 58 to insure that the auger 212 is kept in a vertical position during a boring operation and to control rotational speed. The controller also receives data instructions from either a data card or a memory device to maximize the rotation speed of the auger without stalling the engine 20.

FIG. 7B shows an orange peel grapple 214 attached to backhoe boom 48. The data instructions specific to the grapple 214 include coordinated control of the backhoe boom 48 to map the lever motion to linear Cartesian motion of the backhoe boom 48. This makes craning operations easier for the operator.

FIG. 7C shows a hydraulic drill 216 attached to the backhoe boom 48. The drill 216 requires specific data instructions to operate cylinders 56 and 58 to insure that the drill 216 is kept in a vertical position during drilling and to control the rotational speed. The controller also receives specific data instructions to maximize the rotation speed of the drill without stalling the engine.

Figure 8A:
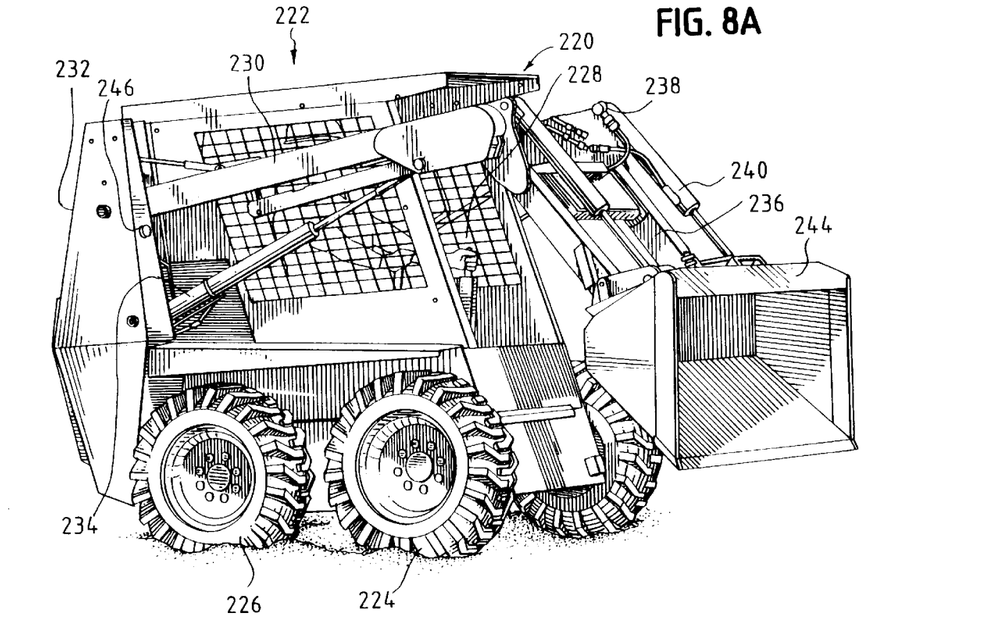
FIGS. 8A–8B are perspective views of an alternate work vehicle using different implement attachments according to the present invention.

The present invention may be applied to any work vehicle. For example, FIG. 8A shows a second type of work vehicle 220. In this embodiment, the work vehicle 220 is a skid steer such as a Model 1838 skid steer manufactured by Case Corporation. The work vehicle 220 has a body 222 which is supported by front and rear wheels 224 and 226. The user operates the vehicle 220 from an operator compartment 228. The work vehicle 220 is powered by a hydrostatic drive which converts engine power to driving the hydraulic actuators.

A pair of loader arms 230 are mounted on upright supports 232 to the rear of the operator compartment 228. The loader arms 230 may be raised and lowered by actuating lift actuators 234. The lift actuators 234 are both hydraulic cylinders. The loader arms 230 are pivotally coupled to tilt arms 236 at pivot 238. The tilt arms 236 are rotated around the pivot 238 by means of tilt actuators 240 which are hydraulic cylinders. The tilt arms 236 are attached to an implement attachment. The implement attachment in this embodiment is a loader bucket 244.

An electronic controller (not shown) similar to either the control unit 100 in FIG. 3, or the control unit 130 in FIG. 4, or the control unit 160 in FIG. 5 controls the hydraulic actuation to actuators 234 and 240. An additional hydraulic port 246 is provided for additional hydraulic actuation. The controller responds to movement of controls in the operator compartment 228. The controller is programmed in the same manner as described above, i.e. through a memory card, a sensor or display, identifying instruction data to be loaded in the controller.

With the loader bucket 244, the controller adjusts the actuators 234 to provide accurate anti-rollback and other functions of the loader bucket 244. The controller also allows an operator to move the loader bucket 244 in a fixed position. As with the previously discussed attachments, different sized loader buckets may be substituted for the loader bucket 244. The different size, shape and weight of these buckets is compensated by programming the controller for the specific kinematics and dynamics for manipulating the particular bucket. Of course instructions for other functions may be transmitted to the controller for buckets or any of the other attachments described in this application and the like.

Figure 8B:
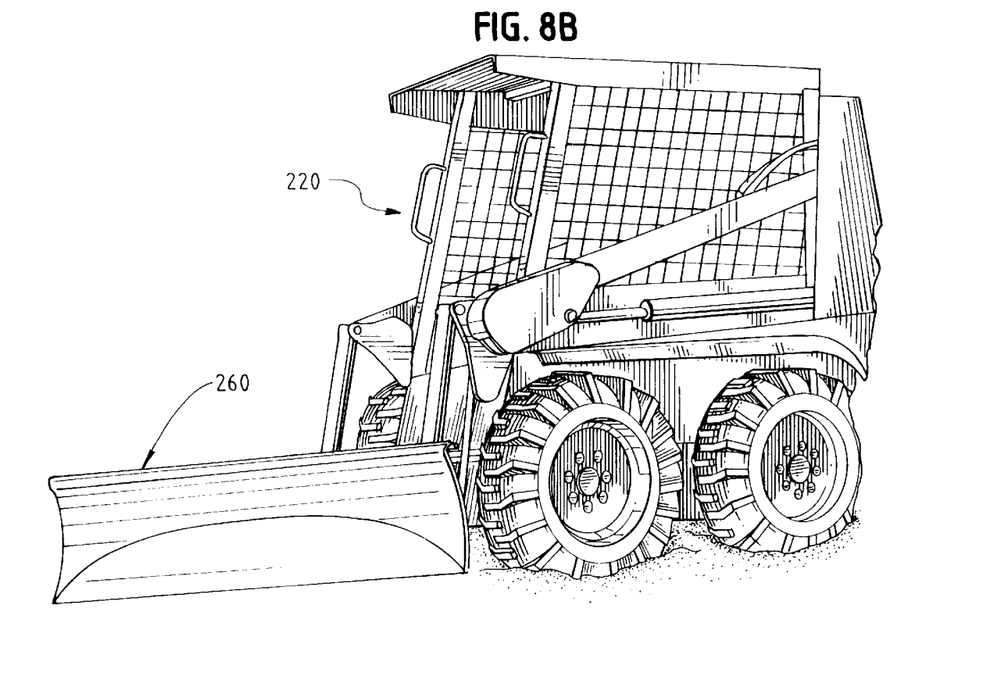

FIG. 8B shows the attachment of a utility/snow blade 260 to the tilt arms 236. The utility/snow blade may be used to perform utility dozing, backfilling and snow removal. The controller is programmed to disable the anti-rollback function. The controller is also programmed to modify the anti-gouge function to ensure the utility/snow blade does not hit the ground while the tilt arms 236 execute a return to dig or a return to position operation.

Other implement attachments for the work vehicle 220 may include, for example, a vibratory roller, a trencher, a cement mixer, a hammer/breaker, a hydraulic hammer, a rockwheel, an auger, a pallet fork, a broom, a shear, a pick up sweeper, a preparator, a tree shear, a stump grinder, a landscape rake, a flail mower, a tree spade, a tiller, a snow blower, a bale spike, a grapple, a vibratory roller and a scraper blade. The present invention allows the adaptation of the controller for the characteristics for each different attachable implement.

Figure 9A:
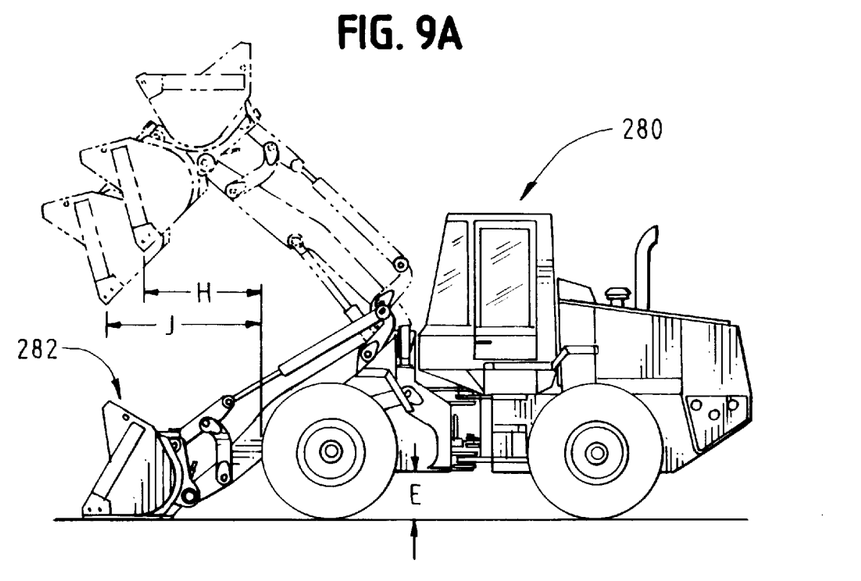
FIGS. 9A–9C are perspective views of another alternate work vehicle using different implement attachments according to the present invention.
Figure 9B:
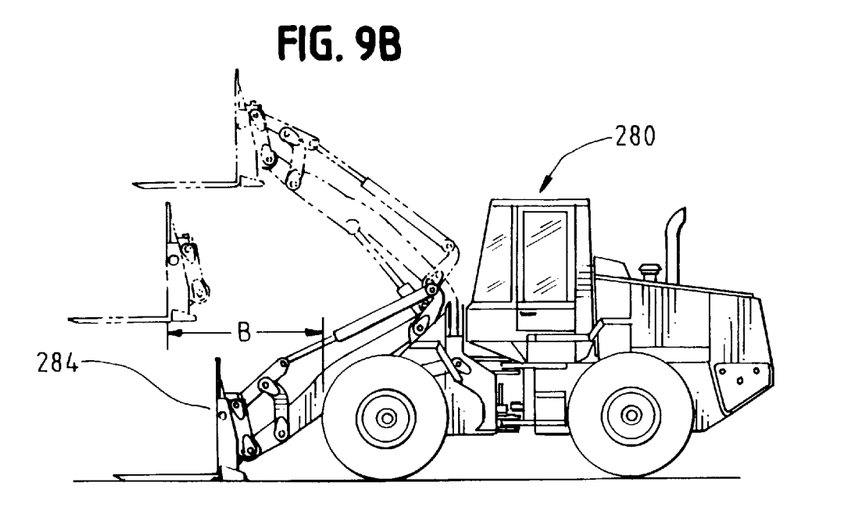
Figure 9C:
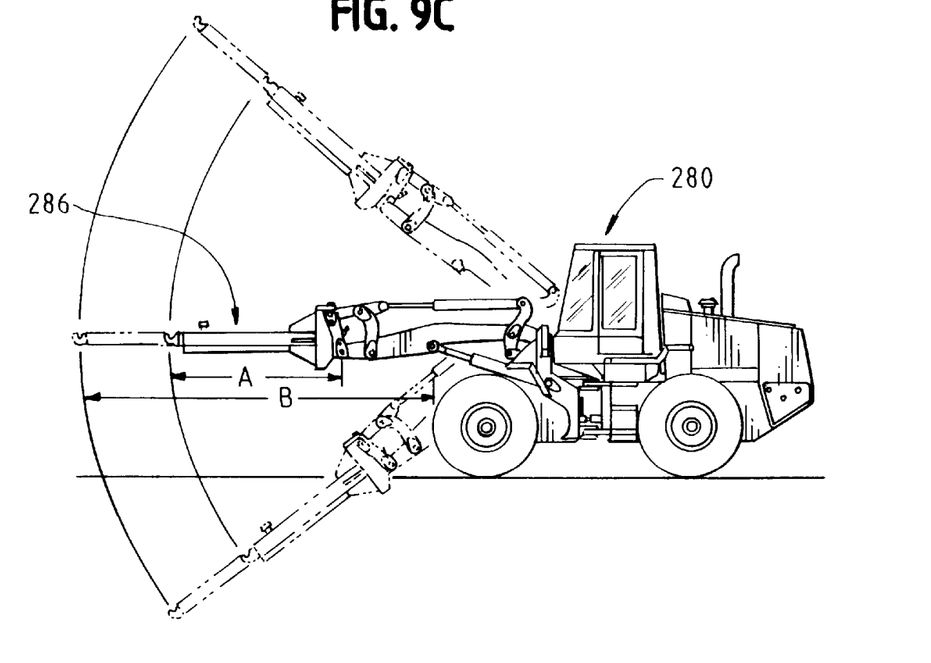

FIGS. 9A–9C show a wheel loader 280 which is a Model 721 Wheel Loader manufactured by Case Corporation. The wheel loader 280 may have different implement attachments such as a loader bucket 282 shown in FIG. 9A, a loader fork 284 shown in FIG. 9B or a jib boom 286 shown in FIG. 9C. The wheel loader 280 has a controller for the implement attachments which is programmed with specific instructions for each attachment in the manner explained above.

Figure 10:
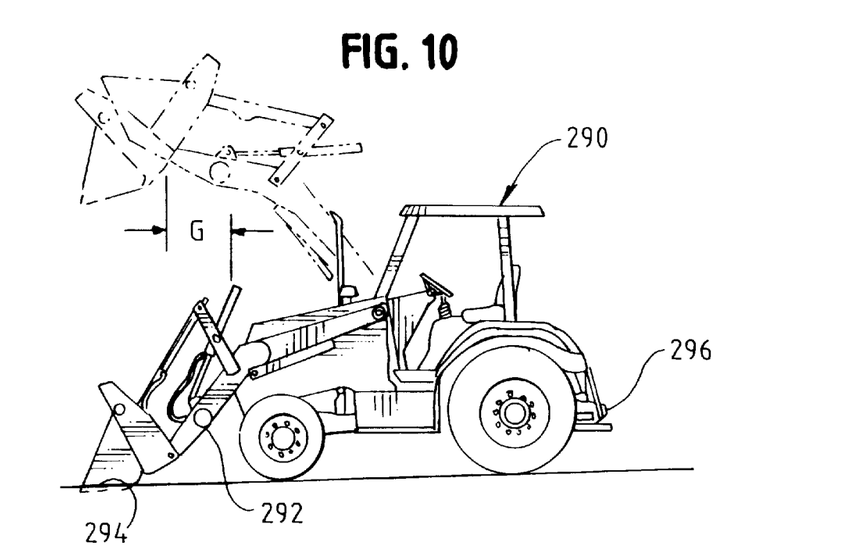
FIG. 10 is a perspective view of another work vehicle which may use different implement attachments according to the present invention.

FIG. 10 shows a loader 290 which may be a Model 570LXT Loader manufactured by Case Corporation. The loader 290 has a pair of front actuator arms 292 which allow for the attachment of a front implement attachment such as loader bucket 294. The loader 290 also has a rear implement attachment point 296 which is a three point hitch. The loader 290 may have a controller for both the front implement attachment and attachments which may be connected to the rear attachment point 296.

It will be apparent to those skilled in the art that various modifications and variations can be made in the method and system of the present invention without departing from the spirit or scope of the invention. For example, many other attachable work implements may use the present invention. Additionally, other work vehicles such as excavators, trenchers, combines, tractors, etc., may use the present invention to maximize the efficient of attachable implements. Thus, the present invention is not limited by the foregoing descriptions but is intended to cover all modifications and variations that come within the scope of the spirit of the invention and the claims that follow.

What is claimed is:

1. A control system for a work vehicle, wherein the control system is adaptable to a variety of implement attachments alternatively attached to the actuator of the work vehicle, and wherein the control system is responsive to commands from the vehicle's operator, comprising:
   a data storage device having instruction data relating to the implement attachment;
   a memory unit, containing programs and data for the basic operation of the actuator in response to operator commands; and
   a controller operatively coupled to the data storage device and to the memory unit, and receiving instruction data from the data storage device and the memory unit, wherein the controller communicates control instructions to the actuator.

2. The system of claim 1, further comprising a user operated control device coupled to the controller, which communicates the operator commands to the controller and wherein the controller activates the actuator in response to the user operated control device.

3. The control system of claim 1 wherein the data storage device comprises:
   a data device reader coupled to the controller; and
   a removable memory mateable with the data device reader which stores the instruction data related to the implement attachment.

4. The system of claim 3 wherein the removable memory is a PCMCIA card.

5. The system of claim 3 wherein the removable memory is a magnetic disk.

6. The system of claim 3 wherein the removable memory is a CD-ROM.

7. The control system of claim 1 wherein the controller limits the degree of motion of the actuator in response to the instruction data.

8. The control system of claim 1 wherein the controller positions the actuator to a specific location in response to the instruction data.

9. The control system of claim 1 wherein the work vehicle includes an engine and a hydraulic fluid pump, the engine powering the hydraulic fluid pump and wherein the actuator is a hydraulic actuator coupled to the hydraulic fluid pump and wherein the controller output is coupled to a hydraulic fluid valve coupled to the hydraulic actuator.

10. The system of claim 9 wherein the implement attachment is a loader bucket.

11. The system of claim 9 wherein the implement attachment is a digger bucket.

12. The system of claim 9 wherein the implement attachment is a pair of loading forks.

13. The system of claim 9 wherein the implement attachment is a jib boom.

14. The system of claim 9 wherein the work vehicle has an auxiliary hydraulic circuit coupled to the hydraulic fluid pump and the implement attachment is an auger which draws rotational motion from the auxiliary hydraulic circuit of the work vehicle.

15. The system of claim 14, wherein the data storage device includes instruction data to maximize the auger rotation without stalling the engine.

16. An adaptable control system for operating different implement attachments wherein the control system is responsive to the commands of the vehicle's operator, and is mounted on a work vehicle having an actuator for attachment and operation of different implement attachments, the control system comprising:
   a controller having an output coupled to the actuator, the controller activating the actuator in response to instruction data and the commands of the vehicle's operator;
   an implement attachment identification device operatively coupled to the controller which identifies the implement attachment and transmits identification data to the controller; and
   a data storage mechanism operably coupled to the controller containing programs and data for the basic operation of the actuator in response to operator commands, and wherein said data storage device transmits selected instruction data relating to the implement attachment according to the identification data transmitted by the implement attachment identification device.

17. The system of claim 16, further comprising a user operated control device coupled to the controller which communicates the operator commands to the controller, and wherein the controller activates the actuator in response to the user operated control device.

18. The control system of claim 16 wherein the implement attachment identification device includes:
   a non-contact sensor coupled to the controller; and
   an identification indicator identifying the implement attachment located on the implement attachment.

19. The control system of claim 18 wherein the sensor is an optical sensor and the identification indicator is an optically readable surface data relating to the implement attachment.

20. The control system of claim 19 wherein the optical sensor is a bar code scanner and the optically readable surface is a bar code.

21. The control system of claim 18 wherein the sensor is an RF sensor and the identification indicator is an RF signal transmitter.

22. The control system of claim 18 wherein the sensor is an infra-red sensor and the identification indicator is an infra-red signal transmitter.

23. The control system of claim 16 wherein the implement attachment identification device includes a visual display which displays different implements and a selection device, wherein the selection device is coupled to controller.

24. The control system of claim 23 wherein the display is a CRT.

25. The control system of claim 23 wherein the display is a LCD.

26. The control system of claim 23 wherein the selection device is a touch screen.

27. The control system of claim 23 wherein the selection device is a keypad.

28. The control system of claim 16 wherein the controller limits the degree of motion of the actuator in response to the selected instructions.

29. The control system of claim 16 wherein the controller positions the actuator to a specific location in response to the selected instructions.

30. The control system of claim 16 wherein the work vehicle includes an engine and a hydraulic fluid pump, the engine powering the hydraulic fluid pump and wherein the actuator is a hydraulic actuator coupled to the hydraulic fluid pump and wherein the controller is coupled to a hydraulic fluid valve coupled to the hydraulic actuator.

31. The system of claim 30 wherein the implement attachment is a loader bucket.

32. The system of claim 30 wherein the implement attachment is a digger bucket.

33. The system of claim 30 wherein the implement attachment is a pair of loading forks.

34. The system of claim 30 wherein the implement attachment is a jib boom.

35. The system of claim 16 wherein the work vehicle has an auxiliary hydraulic circuit coupled to the hydraulic fluid pump and the implement attachment is an auger which draws rotational motion from the auxiliary hydraulic circuit of the work vehicle.

36. The system of claim 35, wherein the data storage device includes instruction data to maximize the auger rotation without stalling the engine.

37. The system of claim 16 wherein said data storage mechanism comprises:
a first data storage device operably, wherein said first data storage device is operably coupled to the controller and contains programs and data for the basic operation of the actuator in response to operator commands; and
a second data storage device, wherein said second data storage device is operably coupled to the controller and transmits selected instruction data relating to the implement attachment according to the identification data transmitted by the implement attachment identification device.

38. The system of claim 37 wherein the data storage device is a CD-ROM.

39. The system of claim 37 wherein the data storage device is a EEPROM.

40. The system of claim 37 wherein the data storage device is a ROM.

41. The system of claim 37 wherein the data storage device is a hard disk.

42. The system of claim 37 wherein the data storage device is a PCMCIA card.

* * * * *